United States Patent
Mathurin

(10) Patent No.: US 11,586,593 B2
(45) Date of Patent: Feb. 21, 2023

(54) MECHANISM FOR SYNCHRONIZATION OF HIERARCHICAL DATA BETWEEN A MOBILE DEVICE AND MULTI TENANT DATABASE

(71) Applicant: salesforce.com, inc., San Francisco, CA (US)

(72) Inventor: Wolfgang Mathurin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 887 days.

(21) Appl. No.: 15/629,889

(22) Filed: Jun. 22, 2017

(65) Prior Publication Data

US 2018/0373729 A1  Dec. 27, 2018

(51) Int. Cl.
| | |
|---|---|
| G06F 16/14 | (2019.01) |
| G06F 16/182 | (2019.01) |
| G06F 16/23 | (2019.01) |
| G06F 16/27 | (2019.01) |
| G06F 16/178 | (2019.01) |
| G06F 16/28 | (2019.01) |

(52) U.S. Cl.
CPC ........ G06F 16/1844 (2019.01); G06F 16/156 (2019.01); G06F 16/178 (2019.01); G06F 16/27 (2019.01); G06F 16/273 (2019.01); G06F 16/275 (2019.01); G06F 16/282 (2019.01)

(58) Field of Classification Search
CPC .... G06F 16/1844; G06F 16/27; G06F 16/273; G06F 16/156; G06F 16/275; G06F 16/1794; G06F 16/25; G06F 16/1787; G06F 16/835; G06F 16/2279; G06F 16/8373; G06F 16/23; G06F 16/2358; G06F 16/282

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |

(Continued)

OTHER PUBLICATIONS

Little _et_al: Synchronization and Storage Models for Multimedia Objects IEEE Journal vol. No. 3, Apr. 1990.*

Primary Examiner — Tamara T Kyle
Assistant Examiner — Berhanu Mitiku
(74) Attorney, Agent, or Firm — Kwan & Olynick LLP

(57) ABSTRACT

Techniques and structures to synchronize hierarchical data, comprising. A conflict between data stored at a computing device and data stored at a service provider database is detected. A synchronization operation is performed to synchronize a plurality of objects within the hierarchical entity data stored at the computing device with hierarchical entity data stored at the service provider database.

27 Claims, 17 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0055825 A1* | 3/2003 | Chen .................. G06F 16/27 |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0100834 A1* | 5/2007 | Landry .................. G06F 16/25 |
| 2009/0177744 A1 | 7/2009 | Marlow et al. |
| 2012/0173485 A1* | 7/2012 | Kothule ................ G06F 16/275 |
| | | 707/634 |
| 2014/0019522 A1* | 1/2014 | Weng .................... H04L 67/32 |
| | | 709/203 |
| 2014/0068404 A1* | 3/2014 | Stiffler ................ G06F 40/174 |
| | | 715/227 |
| 2015/0100546 A1* | 4/2015 | Eberlein ............ G06F 16/1787 |
| | | 707/610 |

\* cited by examiner

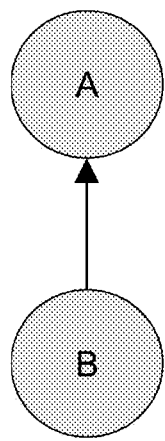 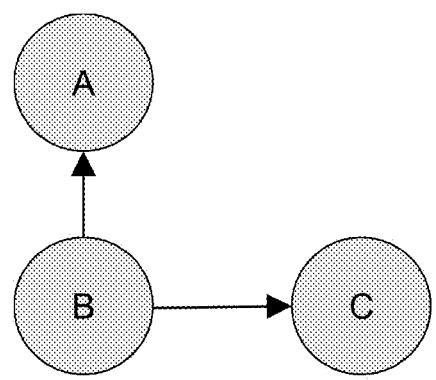
FIG. 4A                    FIG. 4B

| Relationship type | Soups fields expected | Information passed to sync up target |
|---|---|---|
| Master-Detail | Soup for masters:<br>- Field for server id of record<br>Soup for details:<br>- Field for server id of record<br>- Field for local id of master record<br>- Field for server id of master record | Names of master and detail soups<br>Fields to sync up in master and detail soup<br>Names of server id fields in master and detail soups<br>Names of fields in detail soup that holds master record local and server ids<br>Optionally names of last modified date fields in master and detail soups |
| Lookup | Same as master-detail | Same as master-detail<br>But the fact it is a lookup relationship should be indicated as well since it changes the behavior during delete |
| Junction | Soup for first record of join:<br>- Field for server id of record<br>Soup for second record of join: | Names of the three soups<br>Fields to sync up in the three soups |
|  | - Field for server id of record<br>Soup for junctions:<br>- Field for server id of record<br>- Field for local id of first record<br>- Field for server id of first record<br>- Field for local id of second record<br>- Field for server id of second record | Names of server id fields in the three soups<br>Names of fields in junction soup that holds local and server ids for the other two soups<br>Optionally names of last modified date fields in the three soups |

FIG. 7

| Relationship type | Soups fields expected | Information passed to sync up target |
|---|---|---|
| Master-Detail | Soup for masters:<br>- Field for server id of record<br>Soup for details:<br>- Field for server id of record<br>- Field for local id of master record<br>- Field for server id of master record | Names of master and detail soups<br>Fields to sync down in master and detail soup<br>Names of server id fields in master and detail soups<br>Names of fields in detail soup that holds master record local and server ids<br>Filter to apply in SOQL query on root records during sync down |
| Lookup | Same as master-detail | Same as master-detail |
| Junction | Soup for first record of join:<br>- Field for server id of record<br>Soup for second record of join:<br>- Field for server id of record<br>Soup for junctions:<br>- Field for server id of record<br>- Field for local id of first record<br>- Field for server id of first record<br>- Field for local id of second record<br>- Field for server id of second record | Names of the three soups<br>Fields to sync down in the two record soups<br>Names of server id fields in the three soups<br>Names of fields in junction soup that holds local and server ids for the other two soups<br>Filter to apply in SOQL query on root records during sync down |

FIG. 8

MECHANISM FOR SYNCHRONIZATION OF HIERARCHICAL DATA BETWEEN A MOBILE DEVICE AND MULTI TENANT DATABASE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating synchronization between a mobile device and a server database.

BACKGROUND

Data synchronization is the process of establishing consistency among data from a source to a target data storage and vice versa, and the continuous harmonization of the data over time. For instance, in mobile device applications, a mobile device can be represented by a node in a network that is intermittently connected to the network and needs to synchronize regularly with other nodes on the network to maintain the consistency of its data. However, the efficient synchronization of hierarchical data between mobile devices and server databases has suffered from limitations.

Hierarchical data is a data model in which the data is organized into a tree-like structure. The data is stored as records that are connected to one another through links. A record is a collection of fields, with each field containing only one value. The entity type of a record defines which fields the record contains. The problem with hierarchical data synchronization is that multiple synchronization calls are typically necessary to sync one object at a time. Since wireless bandwidth between the mobile device and the target database is often limited, the syncing of graphs or related objects, which include numerous objects, is inefficient.

BRIEF DESCRIPTION OF THE DRAWINGS

In the following drawings like reference numbers are used to refer to like elements. Although the following figures depict various examples, one or more implementations are not limited to the examples depicted in the figures.

FIG. 4A illustrates one embodiment of a single one to many relationship;

FIG. 4B illustrates one embodiment of a single many to many relationship;

FIG. 7 is a table illustrating one embodiment of a recap of a sync up process;

FIG. 8 is a table illustrating one embodiment of a recap of a sync down process;

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Methods and systems are provided for facilitating synchronization of hierarchical data between a mobile device and a multi-tenant database system ("MTDBS"). Embodiments provide for the mobile device including a synchronization mechanism having a data store to store the hierarchical data and a synchronization engine to facilitate the synchronization of one or more entities within the hierarchical entity data stored at the mobile device with hierarchical entity data stored at the service provider database by issuing a request to update the service provider database in a single call. In a further embodiment, the synchronization mechanism includes a sync up manager to update the service provider database with changes made to the hierarchical entity data at the mobile application, and a sync down manager to receive hierarchical entity data from the service provider database upon a change to the hierarchical entity data at the service provider database.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Figure 1:
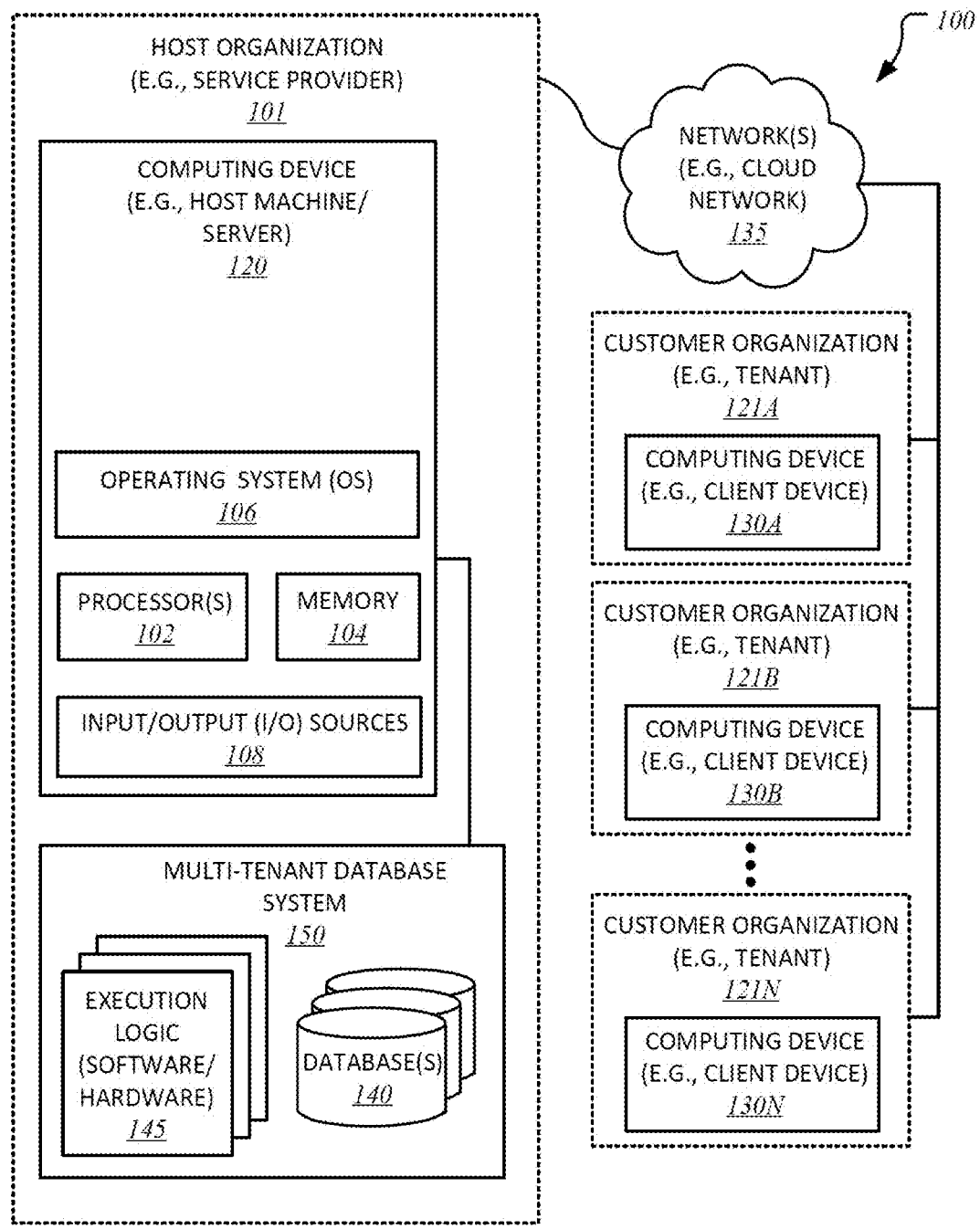
FIG. 1 illustrates one embodiment of a system having a computing device.

FIG. 1 illustrates a system 100 having a computing device according to one embodiment. In one embodiment, computing device 120 includes a host server computer serving a host machine. It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

In one embodiment, computing device 120 may serve as a service provider core (e.g., Salesforce.com® core) in communication with one or more database(s) 140, one or more client computers 130A-N, over one or more network(s) 135, and any number and type of dedicated nodes. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 150 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
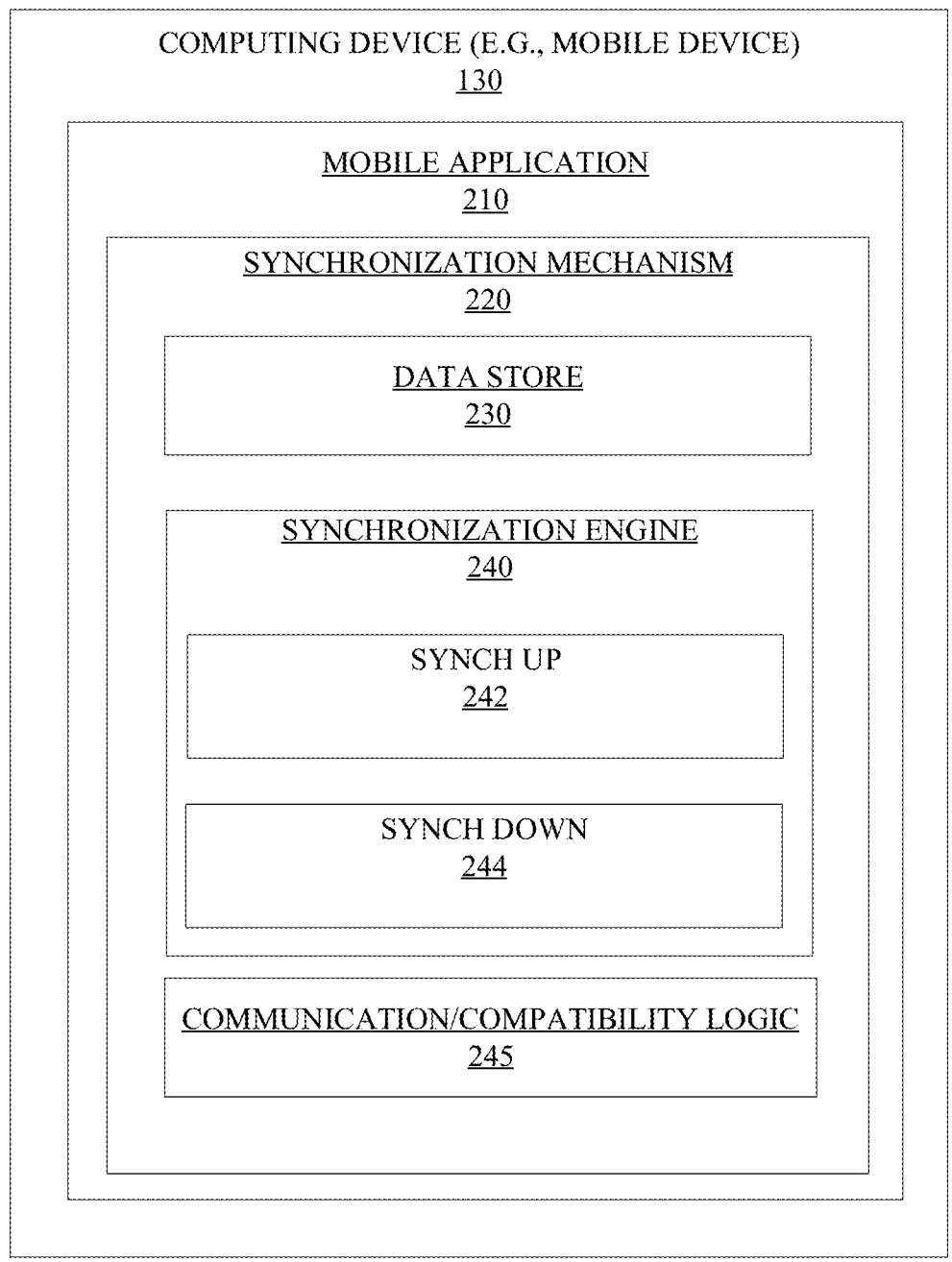
FIG. 2 illustrates a smart synchronization mechanism according to one embodiment.

FIG. 2 illustrates one embodiment of a client computing device 130. In this embodiment, computing device 130 is a mobile device hosting a mobile application 210 that accesses multi-tenant database system 150 at host organization 101 via requests. According to one embodiment, mobile application 210 maintains a local copy of data stored in customer organizations 121A-N pertinent to the particular customer organization 121 to which computing device 130 is associated. In a further embodiment, mobile application 210 includes a synchronization mechanism 220 that enables mobile application 210 to modify (e.g., create/update/delete) related entities offline and synchronize the entities and their relationships with the multi-tenant database system 150 when the device 130 is back online. In yet a further embodiment, synchronization mechanism 220 handles conflicting changes between multi-tenant database system 150 and mobile application 210, as well as minimizes data transfer when moving data to and from device 130.

In one embodiment, synchronization mechanism 220 includes a data store 230 and synchronization engine 240. Data store 230 is a secure relational data store where data models are also flexible and can be changed at runtime. In one embodiment, data store 320 enables similar function as the multi-tenant database system 150, such that new custom objects can be defined, custom fields can be added or removed to existing objects, relationships can be added or modified.

Synchronization engine 240 maintains synchronization between data store 230 and multi-tenant database system 150. According to one embodiment, mobile application 210 is configured to communicate with data store 230, and synchronization engine 240 takes care of maintaining data harmonization between data store 230 and multi-tenant database system 150. Synchronization engine 240 includes a sync up manager 242 to update the multi-tenant database system 150 with changes made locally to data store 230, where a hierarchy of entities is targeted for upload if any records changed. Synchronization engine 240 also includes a sync down manager 244 to receive relevant data from the multi-tenant database system 150, where a hierarchy of entities is targeted for download if any records changed.

In one embodiment, sync up manager 242 and sync down manager 244 support overwrite and leave-if-changed merge modes. For a sync down operation to download a hierarchy of entities from multi-tenant database system 150, the overwrite merge mode features the overwriting of local changes at data store 230, while the leave-if-changed mode indicates that locally changed entities should be left alone. In one embodiment, a sync down manager 244 may implement a full download synchronization of records. However in other embodiments, sync down manager 244 may perform a delta sync, in which only modified records are downloaded. For a sync up operation to upload a hierarchy of entities to multi-tenant database system 150, the overwrite merge mode features the writing over of remotely changed entities, while the leave-if-changed mode indicates that remotely changed entities are to be left alone. Moreover, only locally modified (e.g., created/updated/deleted) records are uploaded during a sync up operation.

Communication/compatibility logic 245 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

Figure 3:
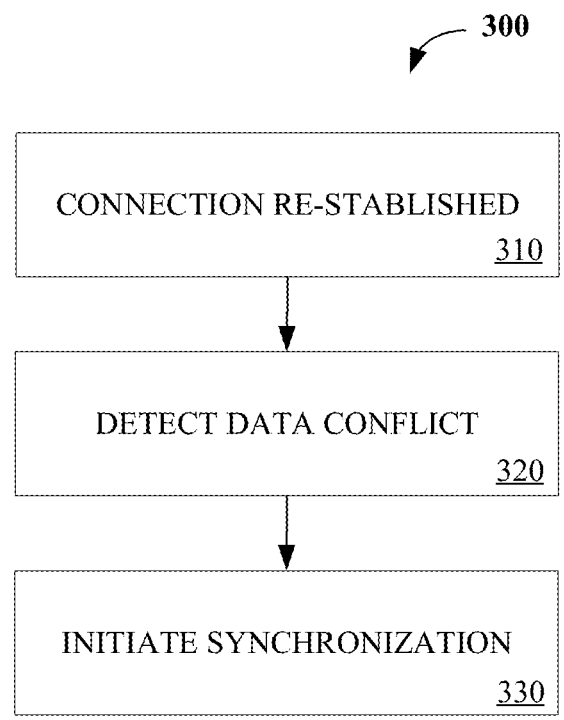
FIG. 3 is a flow diagram illustrating one embodiment of a synchronization process.

FIG. 3 is a flow diagram 300 for facilitating synchronization of a mobile device with a multi-tenant database system according to one embodiment. Method 300 may be performed by processing logic that may comprise hardware (e.g., circuitry, dedicated logic, programmable logic, etc.), software (such as instructions run on a processing device), or a combination thereof. The processes of method 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 300 begins at processing block 310 with the detection that a connection between a mobile device including mobile application 210 has been re-established with multi-tenant database system 150. At processing block 320, synchronization engine 240 detects a conflict between data in the local data store 230 and data at multi-tenant database system 150. In one embodiment, synchronization engine 240 may recognize a conflict based on detected changes to one or more entities at data store 230 while device 130 was offline. Synchronization engine 240 may also query multi-tenant database system 150 to receive an indication whether remote changes have occurred. At processing block 330, synchronization engine 240 initiates synchronization with multi-tenant database system 150 upon detection of a conflict. As discussed above, synchronization engine 240 may implement sync up or sync down operations depending upon where the changes occurred.

Sync Up

In one embodiment, the computing device 120 service provider core supports Master-Detail and Lookup relationships. In a Master-Detail relationship two master-detail fields are allowed per object, in which a parent field is included for a child. Further, access to the parent record determines access to children, deleting a parent automatically deletes the child and up to three levels of relationships are included. In the Lookup relationship, parent on child is not a required field, and the relationship has no impact on security and access, or on deletion. Moreover, the relationship can be multiple layers deep and include up to 25 lookup fields per object.

In a further embodiment, both the Master-Detail and Lookup relationships are one-to-many relationships, and are defined from the many-to-one side (e.g., from a child to a parent). Further, these relationships can be made one-to-one relationship by adding validation rules or triggers. Additionally, a junction object may be implemented to create many to many relationships, where the junction object has lookup fields pointing to the two objects that need to be in a many to many relationship.

According to one embodiment, the service provider core includes composite resources to handle composite requests involving related entities. For instance, functions may include executing several dependent requests from computing device 130 to computing device 120 in a single call, creating nested records, updating fields on an account, creating a contact and linking the two records with a junction object, creating multiple records and updating a record and getting field values in a single request.

In one embodiment, data store 230 includes tables (or soups) for each object type, where the object comprises fields to capture local and remote (e.g., server 120) identifiers (IDs) of related records. In a further embodiment, new sync up targets are initialized with sufficient information regarding the relations between records (e.g., both on the server and in the local store). In such an embodiment, the sync up target operates by iterating over locally changed records of a soup. Thus, each set of related records includes a root record associated with a particular soup, where the sync up iterates over the soup including the root records and uses the information about the relations to pull related records from other soups. To perform the sync up operation, synchronization engine 240 issues a composite request to update the server 130 in a single call (e.g., per set or related records).

According to one embodiment, sync up manager 242 may perform a sync up operation based on one of two scenarios: a single one to many relationship (e.g., a lookup or a master-detail); or a single many to many relationship (e.g., using a junction object). FIG. 4A illustrates one embodiment of a single one to many relationship (or one level deep tree) in which A and B are object types. In this scenario A-B A-B have a master-detail (or lookup (one to many)) relationship. Thus, B has a reference field pointing to an object of type A.

According to one embodiment, mobile application 210 sets up two soups including the following fields:

1. soupA
   a. serverId: to hold the server id of the type A object.
2. soupB
   a. serverId: to hold the server id of the type B object;
   b. parentALocalId: to hold the soup entry id of the parent object of type;
   c. parentAServerId: to hold the server id of the parent object of type A.

In one embodiment, the object type is available in every record, and nested in an "attributes" field). The same is available for children records. In a further embodiment, a new sync up target is generated at initialization and includes the following information:

1. childSoupName: soupB;
2. childCreateFieldlist/childUpdateFieldlist: fields of children to sync up;
3. parentLocalIdFieldName: name of field in child soup containing soup entry id of parent object ("parentALocalId");
4. parentServerIdFieldName: name of field in child soup containing server id of parent object ("parentAServerId"); and
5. the Id and last modification date field names for A and B.

To correctly handle a merge mode (e.g., leave-if-changed vs. overwrite), a fetchRecordModificationDate command fetches the maximum modification dates of all of the related records. In one embodiment, this command is performed by using the following Salesforce® Object Query Language (SOQL): select LastModifiedDate, (select LastModifiedDate from B) from A where Id='id-of-A-record-being-synched-up.' As a result, the max of all the dates are computed and the resulting value is returned. Accordingly, the whole set of records will not be synced up if the merge mode is leave-if-changed, and any of the records in the tree was changed on the server 120 since the last sync down.

According to one embodiment, createOnServer, updateOnServer or deleteOnServer commands are invoked by synchronization engine 240 based on the A local modifications. In a further embodiment, the related records are fetched from data store 230 prior to transmitting to server 120. In one embodiment, the fetch is executed using the SmartSQL query:

```
SELECT {soupB:_soup}
FROM {soupA}, {soupB}
WHERE {soupA:_soupEntryId} = {soupB:parentALocalId}
AND {soupA:_soupEntryId} = 'id-of-current-A-record-being-synced'
```

FIGS. 5A-5D is a flow diagram illustrating a method 500 for facilitating one embodiment of a sync up process. Method 500 may be performed by processing logic that may comprise hardware (e.g., circuitry, dedicated logic, programmable logic, etc.), software (such as instructions run on a processing device), or a combination thereof. The processes of method 500 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter.

At decision block 501 (FIG. 5A), a determination is made as to whether object B has been locally created. If B has been locally created, a determination is made as to whether object A has been locally created, decision block 502. If A has been locally created (e.g., createOnServer command invoked), A and B are saved on the server (e.g., via a composite request), processing block 503. At processing block 504, server IDs are updated in A and B, as well as the parent server Id in B. At processing block 505, local flags are unset in B. At processing block 506, the updated B is saved at data store 230.

If at decision block 502 a determination is made that object A has not been locally created, a determination is made as to whether object A has been locally updated (e.g., updateOnServer command invoked), decision block 512. If A has been locally updated, A and B are saved on the server, processing block 513. At processing block 514, the server Id is updated in B. At processing block 515, local flags are unset in B. At processing block 516, the updated B is saved at data store 230.

If at decision block 512 a determination is made that object A has not been locally updated, object A has been locally deleted (e.g., deleteOnServer command invoked). Thus at processing block 523, A is deleted on the server. At processing block 524, B is deleted from data store 230 if the objects have a Master-Detail relationship. However if operation in a Lookup relationship, the parent Id fields are unset in B, and B is saved on the server. At processing block 525, the server Id is updated in B. At processing block 526, local flags are unset in B. At processing block 527, the updated B is saved at data store 230.

Figure 5A:
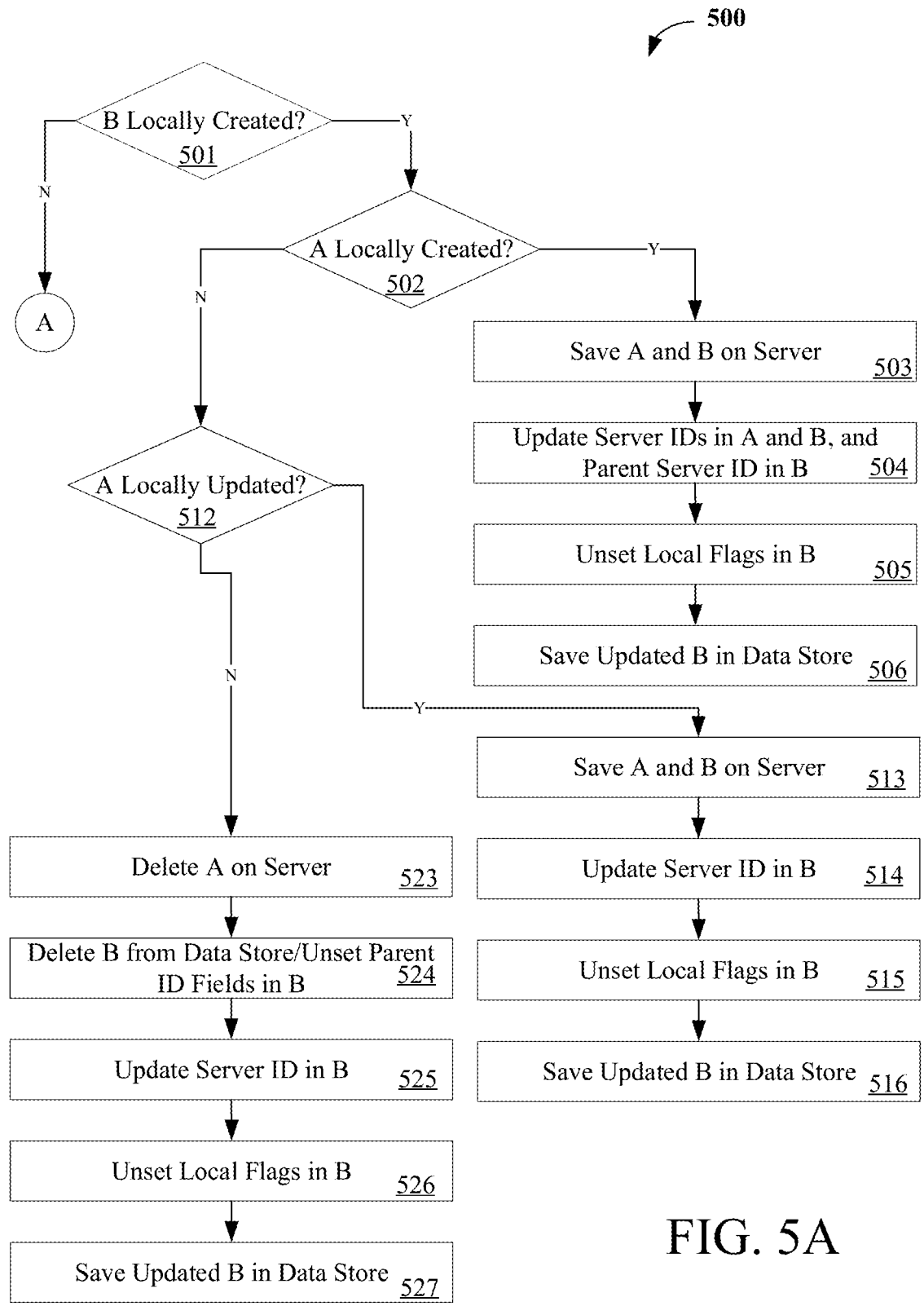
FIGS. 5A-5D is a flow diagram illustrating one embodiment of a sync up process.
Figure 5B:
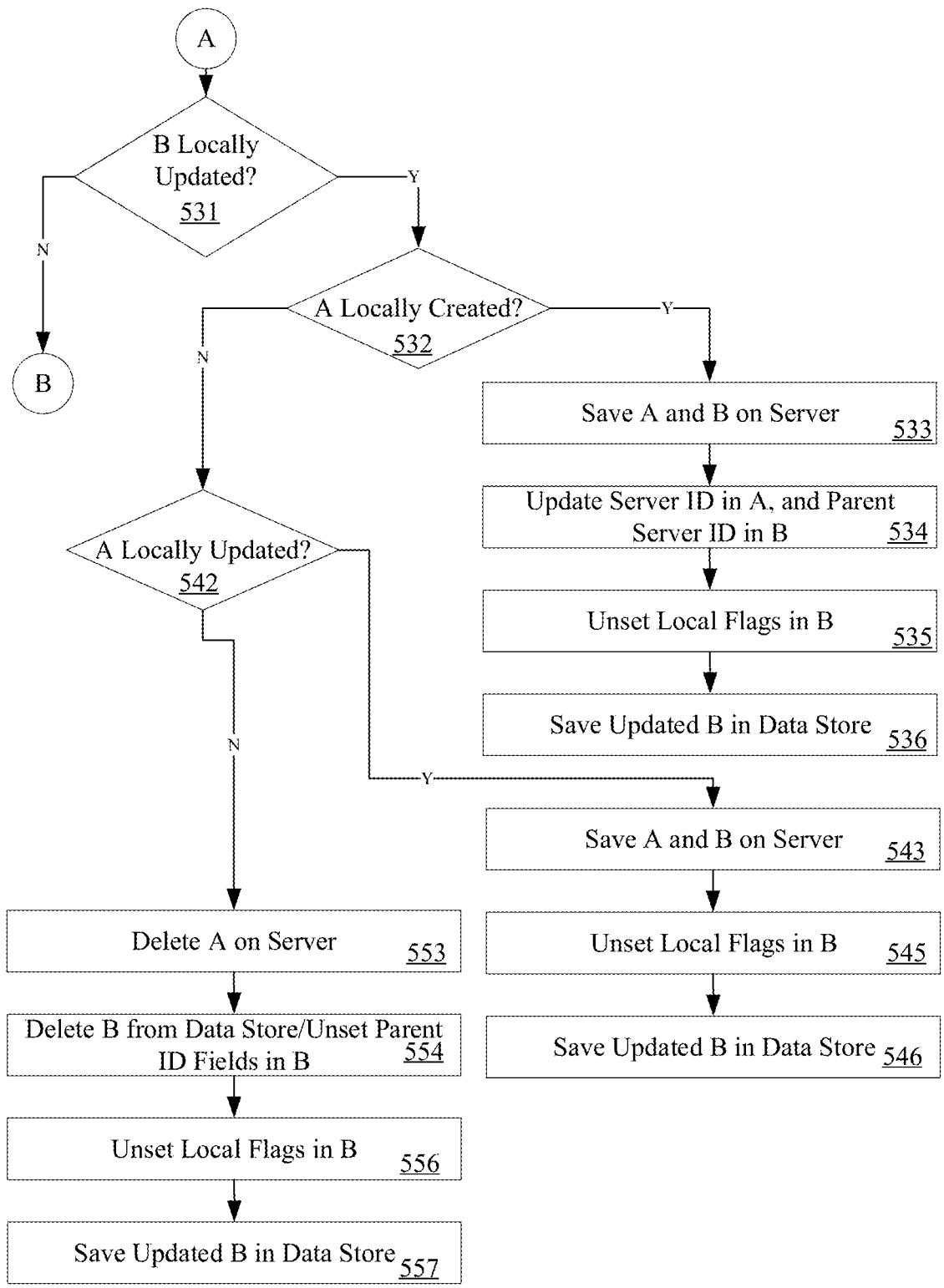

If at decision block 501 a determination is made that object B has not been locally created, a determination is made as to whether object B has been locally updated, decision block 531 (FIG. 5B). If B has been locally updated, a determination is made as to whether object A has been locally created, decision block 532. If A has been locally created, A and B are saved on the server, processing block 533. At processing block 534, the server Id is updated in A, as well as the parent server Id in B. At processing block 535, local flags are unset in B. At processing block 536, the updated B is saved at data store 230.

If at decision block 532 a determination is made that object A has not been locally created, a determination is made as to whether object A has been locally updated, decision block 542. If A has been locally updated, A and B are saved on the server, processing block 543. At processing block 545, local flags are unset in B. At processing block 546, the updated B is saved at data store 230.

If at decision block 542 a determination is made that object A has not been locally updated, object A has been locally deleted. Thus at processing block 553, A is deleted on the server. At processing block 554, B is deleted from data store 230 if the objects have a Master-Detail relationship. However if operation in a Lookup relationship, the parent Id fields are unset in B, and B is saved on the server. At processing block 556, local flags are unset in B. At processing block 557, the updated B is saved at data store 230.

Figure 5C:
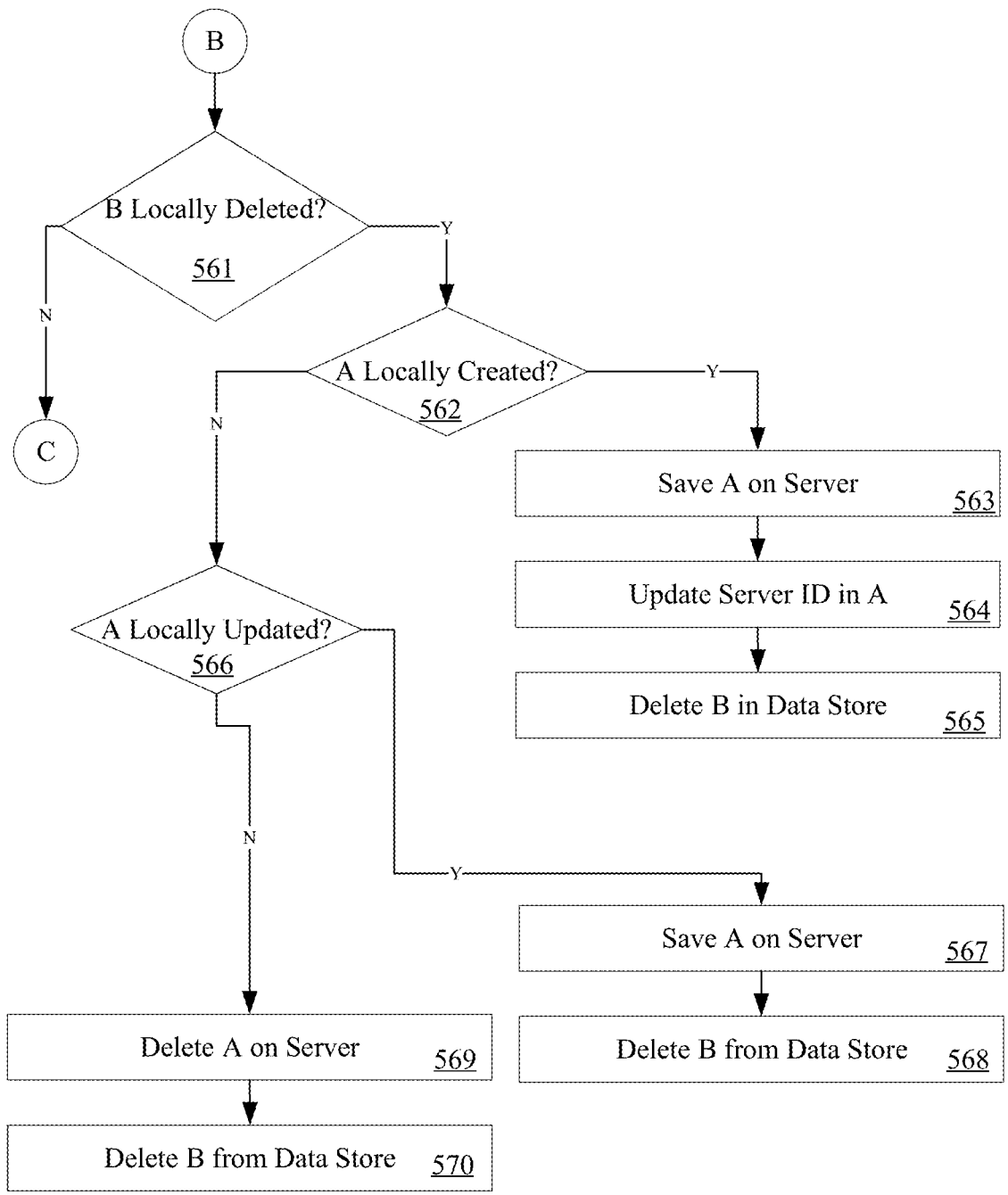
Figure 5D:
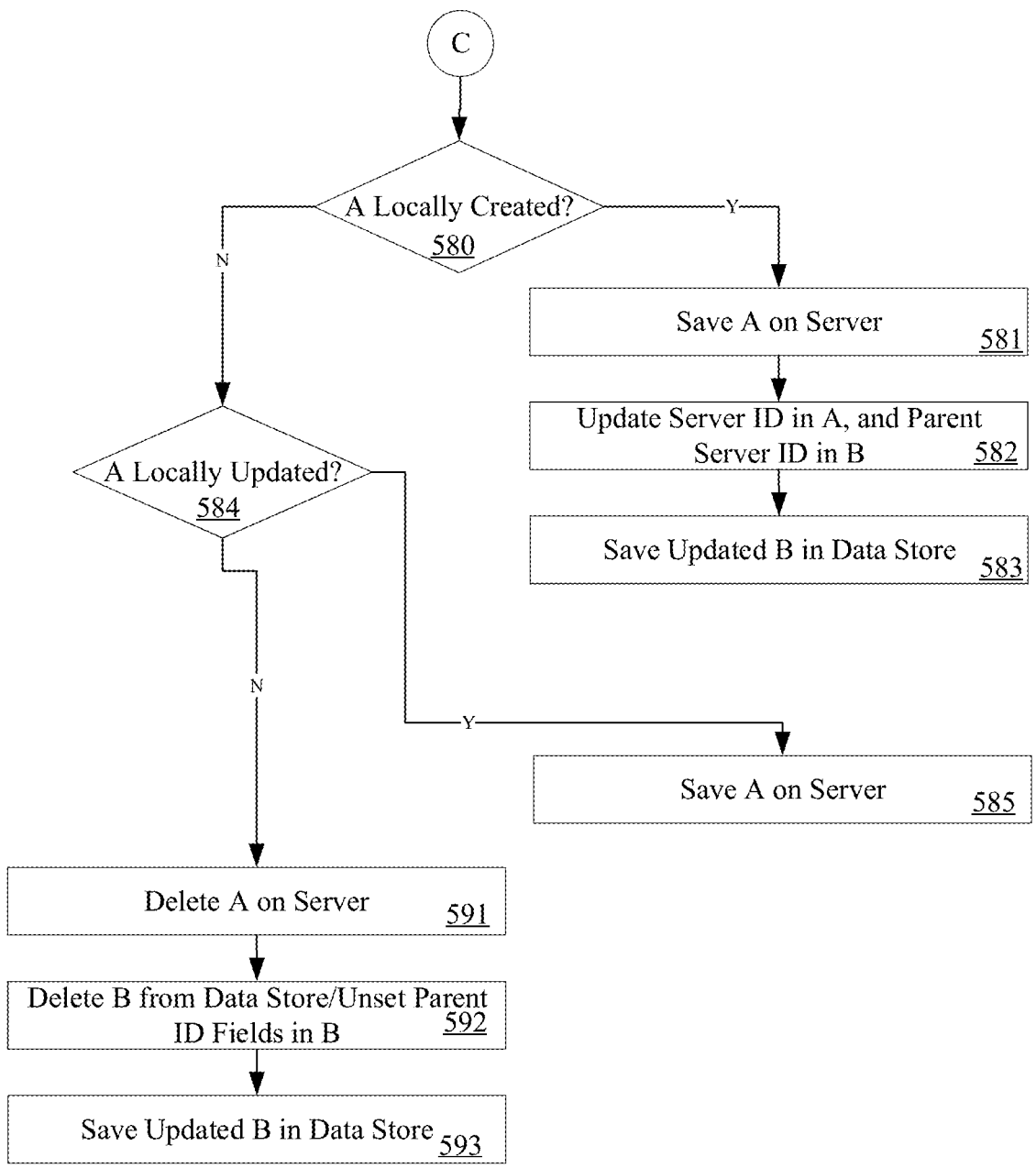

If at decision block 531 a determination is made that object B has not been locally updated, a determination is made as to whether object B has been locally deleted, decision block 561 (FIG. 5C). If B has been locally deleted, a determination is made as to whether object A has been locally created, decision block 562. If A has been locally created, A is saved on the server, processing block 563. At processing block 564, the server Id is updated in A. At processing block 565, B is deleted at data store 230. If at decision block 562 a determination is made that object A has not been locally created, a determination is made as to whether object A has been locally updated, decision block 566. If A has been locally updated, A is saved on the server, processing block 567. At processing block 568, B is deleted at data store 230. If at decision block 566 a determination is made that object A has not been locally updated, object A has been locally deleted. Thus at processing block 569, A is deleted on the server. At processing block 570, B is deleted from data store 230.

If at decision block 561 a determination is made that object B has not been locally deleted, B has not been changed locally. Accordingly at decision block 580 (FIG. 5D), a determination is made as to whether object A has been locally created. If A has been locally created, A is saved on the server, processing block 581. At processing block 582, the server Id is updated in A, as well as the parent server Id in B. At processing block 583, the updated B is saved at data store 230.

If at decision block 580 a determination is made that object A has not been locally created, a determination is made as to whether object A has been locally updated, decision block 584. If A has been locally updated, A is saved on the server, processing block 585. If at decision block 584 a determination is made that object A has not been locally updated, object A has been locally deleted. Thus at processing block 591, A is deleted on the server. At processing block 592, B is deleted from data store 230 if the objects have a Master-Detail relationship. However if operation in a Lookup relationship, the parent Id fields are unset in B, and B is saved on the server. At processing block 592, the updated B is saved at data store 230. In some embodiments, the above-described process is implemented to process scenarios in which there are multiple B records for each A record.

FIG. 4B illustrates one embodiment of a single many to many relationship in which A, B and C are object types. In this scenario A-C have a many to many relationships through the junction object B. Accordingly, B has reference fields pointing to objects of type A and C. In this embodiment, mobile application 210 sets up three soups including the following fields:

1. soupA
   a. serverId: to hold the server id of the type A object.
2. soupB
   a. serverId: to hold the server id of the type B object;
   b. parentALocalId: to hold the soup entry id of the parent object of type;
   c. parentAServerId: to hold the server id of the parent object of type A.
3. soupC
   a. serverId: to hold the server id of the type C object.

In one embodiment, the object type is available in every record, and nested in an "attributes" field). The same is available for B and C records. In a further embodiment, a sync up call is made against soupA and includes the following information:

1. junctionSoupName: "soupB";
2. secondSoupName: "soupC";
3. firstSoupLocalIdField: name of field in junction soup containing soup
4. entry id of parent object A ("parentALocalId");
5. firstSoupServerIdField: name of field in junction soup containing server id of parent object A ("parentAServerId");
6. secondSoupLocalIdField: name of field in junction soup containing soup entry id of parent object C ("parenCLocalId");
7. secondSoupServerIdField: name of field in junction soup containing server id of parent object C ("parentCServerId");

8. junctionCreateFieldlist/junctionUpdateFieldlist: fields of B to sync up;
9. secondRecordCreateFieldlist/secondRecordUpdate-Fieldlist: fields of C to sync up;
10. Id and last modification date field names for A, B and C.

Like previously, to correctly handle a merge mode, the fetchRecordModificationDate fetches the max modification dates of all of the related records by using the following SOQL: select LastModifiedDate, (select LastModifiedDate from A), (select LastModifiedDate from B) from C where parentAId='id-of-A-record-being-synched-up'. Also as discussed above, the max of all the dates are computed and the value returned. Behaviors of createOnServer/updateOnServer/deleteOnServer.

Similarly, createOnServer, updateOnServer or deleteOnServer are invoked depending on A local changes. In this embodiment, the related records are fetched from SmartStore before going to the server, by using the following SmartSQL query:

```
SELECT {soupB:_soup}, {soupC:_soup}
FROM {soupA}, {soupB}, {soupC}
WHERE {soupA:_soupEntryId} = {soupB:parentALocalId}
AND {soupC:_soupEntryId} = {soupB:parentCLocalId}
AND {soupA:_soupEntryId} = 'id-of-current-A-record-being-synced'
```

FIGS. 6A-6D is a flow diagram illustrating a method 600 for facilitating a sync up process for a single many to many embodiment. Method 600 may be performed by processing logic that may comprise hardware (e.g., circuitry, dedicated logic, programmable logic, etc.), software (such as instructions run on a processing device), or a combination thereof. The processes of method 600 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-5 may not be repeated or discussed hereafter.

At decision block 601 (FIG. 6A), a determination is made as to whether object C, and therefore B, has been locally created. If C has been locally created, a determination is made as to whether object A has been locally created, decision block 602. If A has been locally created (e.g., createOnServer command invoked), A, B and C are saved on the server (e.g., via a composite request), processing block 603. At processing block 604, server IDs are updated in A, B and C, as well as the parent server Id in B. At processing block 605, local flags are unset in B and C. At processing block 606, the updated B and C are saved at data store 230.

If at decision block 602 a determination is made that object A has not been locally created, a determination is made as to whether object A has been locally updated (e.g. updateOnServer command invoked), decision block 612. If A has been locally updated, A, B and C are saved on the server, processing block 613. At processing block 614, the server Id is updated in B and C, as well as the parent server Id in B. At processing block 615, local flags are unset in B and C. At processing block 616, the updated B and C are saved at data store 230.

If at decision block 612 a determination is made that object A has not been locally updated, object A has been locally deleted (e.g., deleteOnServer command invoked). Thus at processing block 623, A is deleted on the server. At processing block 624, B is deleted from data store 230. At processing block 625, C is saved on the server. At processing block 626, local flags are unset in C. At processing block 527, the updated C is saved at data store 230.

Figure 6A:
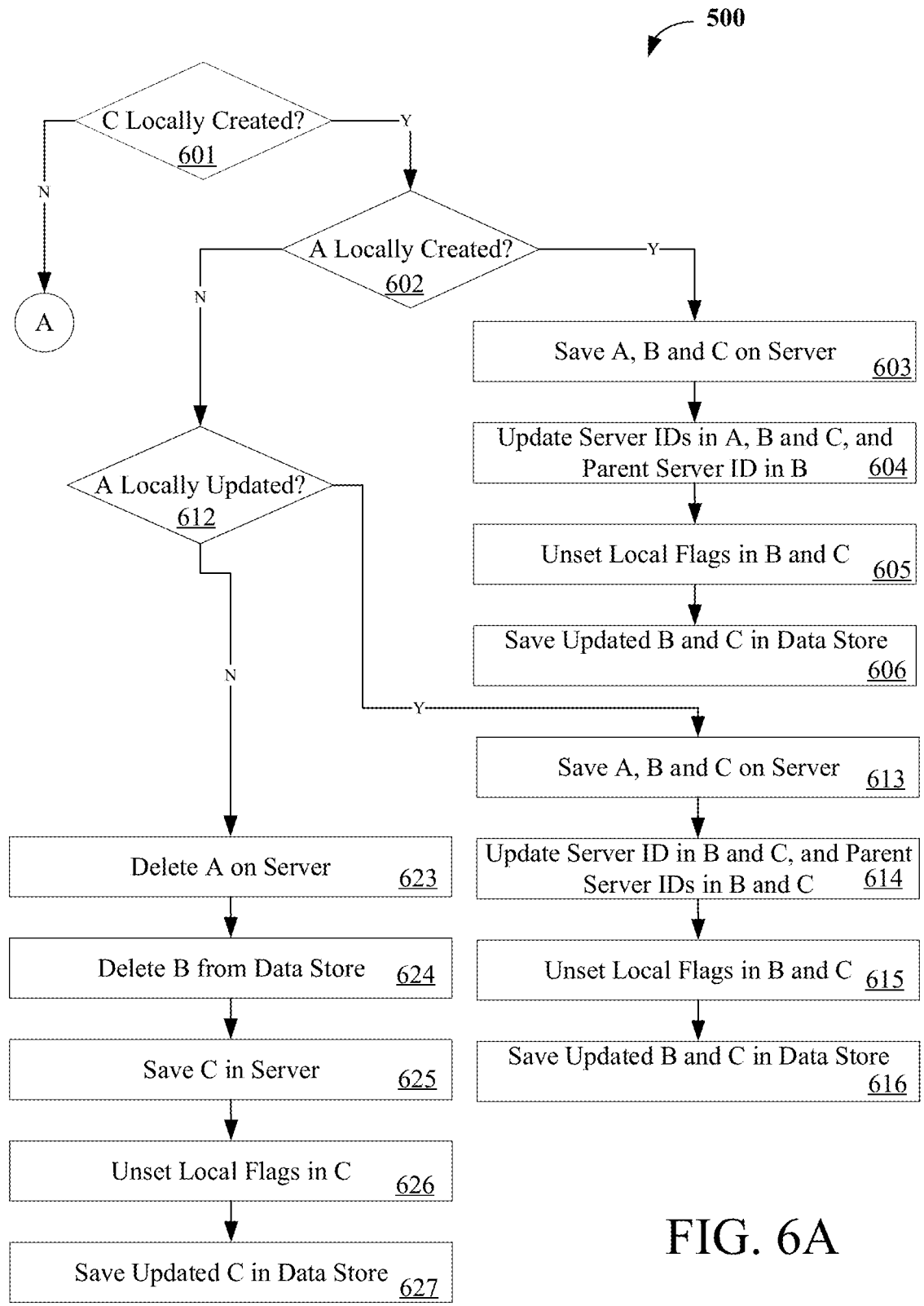
FIGS. 6A-6D is a flow diagram illustrating another embodiment of a sync up process.
Figure 6B:
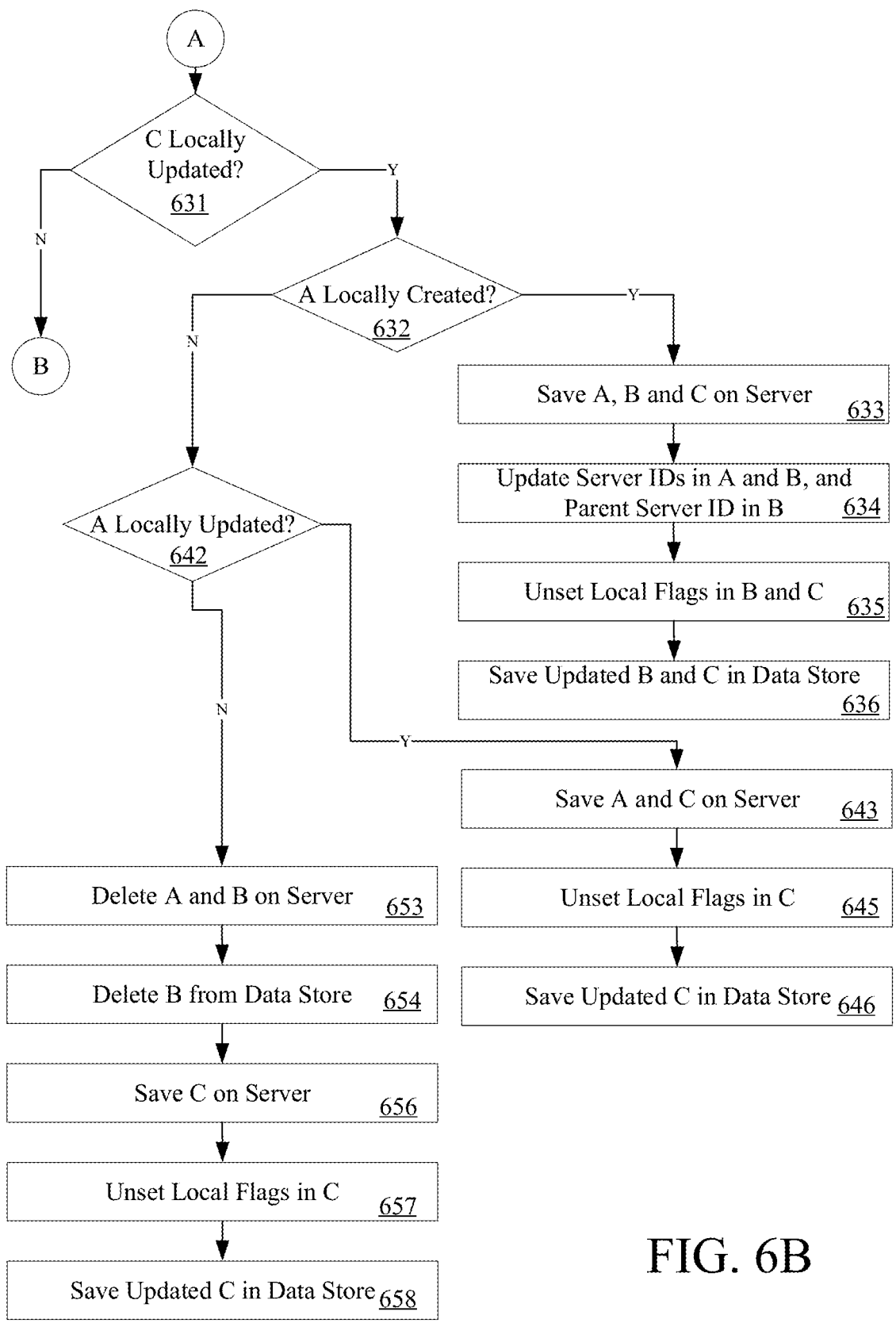

If at decision block 601 a determination is made that object C has not been locally created, a determination is made as to whether object C has been locally updated, decision block 631 (FIG. 6B). If C has been locally updated, a determination is made as to whether object A has been locally created, decision block 632. If A has been locally created, B is also new. As a result, A, B and C are saved on the server, processing block 633. At processing block 634, the server Id is updated in A and B, as well as the parent server Id in B. At processing block 635, local flags are unset in B and C. At processing block 636, the updated B and C are saved at data store 230.

If at decision block 632 a determination is made that object A has not been locally created, a determination is made as to whether object A has been locally updated, decision block 642. If A has been locally updated, B should be unchanged. Thus, A and C are saved on the server, processing block 643. At processing block 645, local flags are unset in C. At processing block 646, the updated C is saved at data store 230. If at decision block 642 a determination is made that object A has not been locally updated, object A has been locally deleted. Thus at processing block 653, A and B are deleted on the server. At processing block 654, B is deleted from data store 230. At processing block 656, C is saved on the server. At processing block 657, local flags are unset in C. At processing block 658, the updated C is saved at data store 230.

Figure 6C:
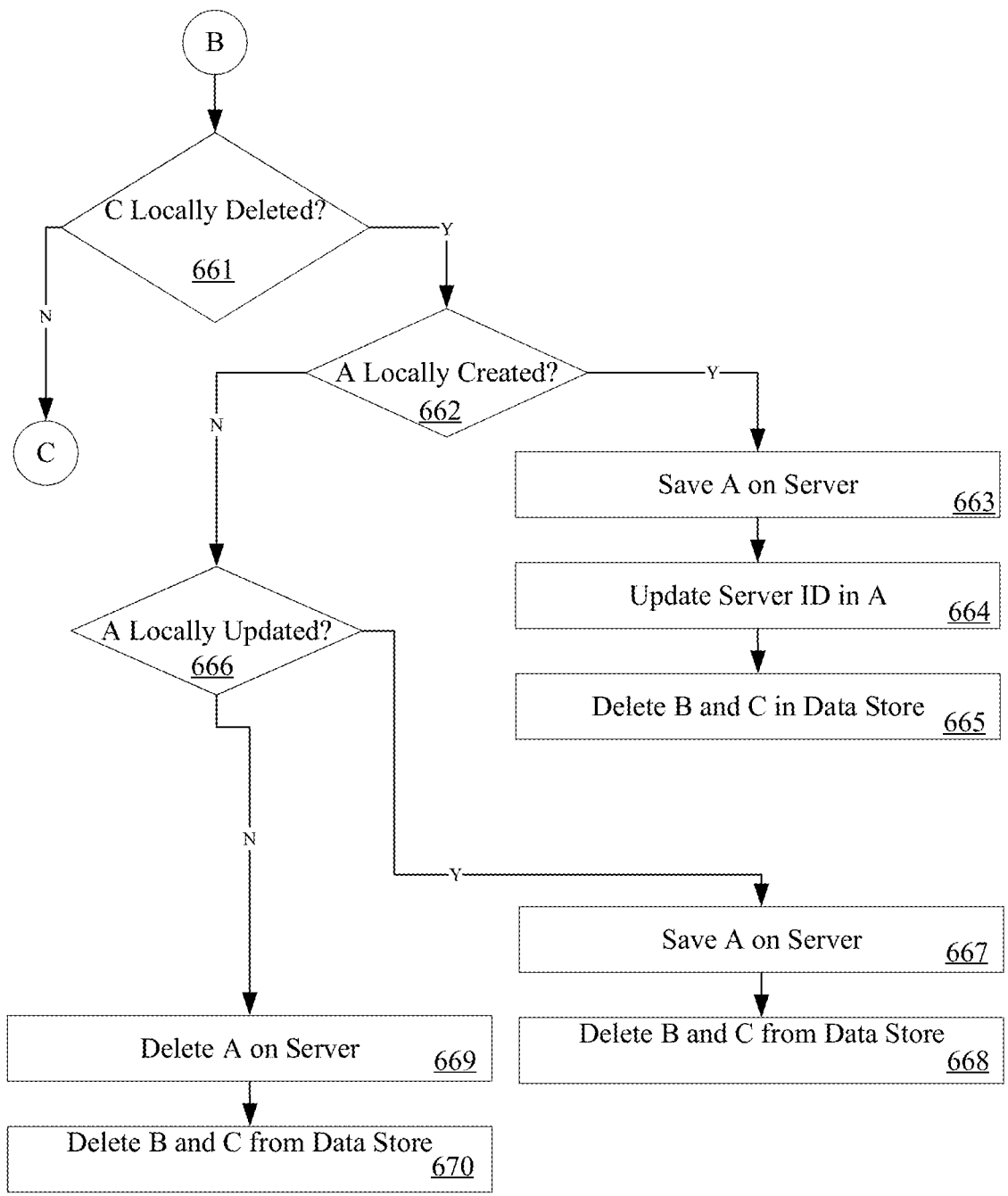
Figure 6D:
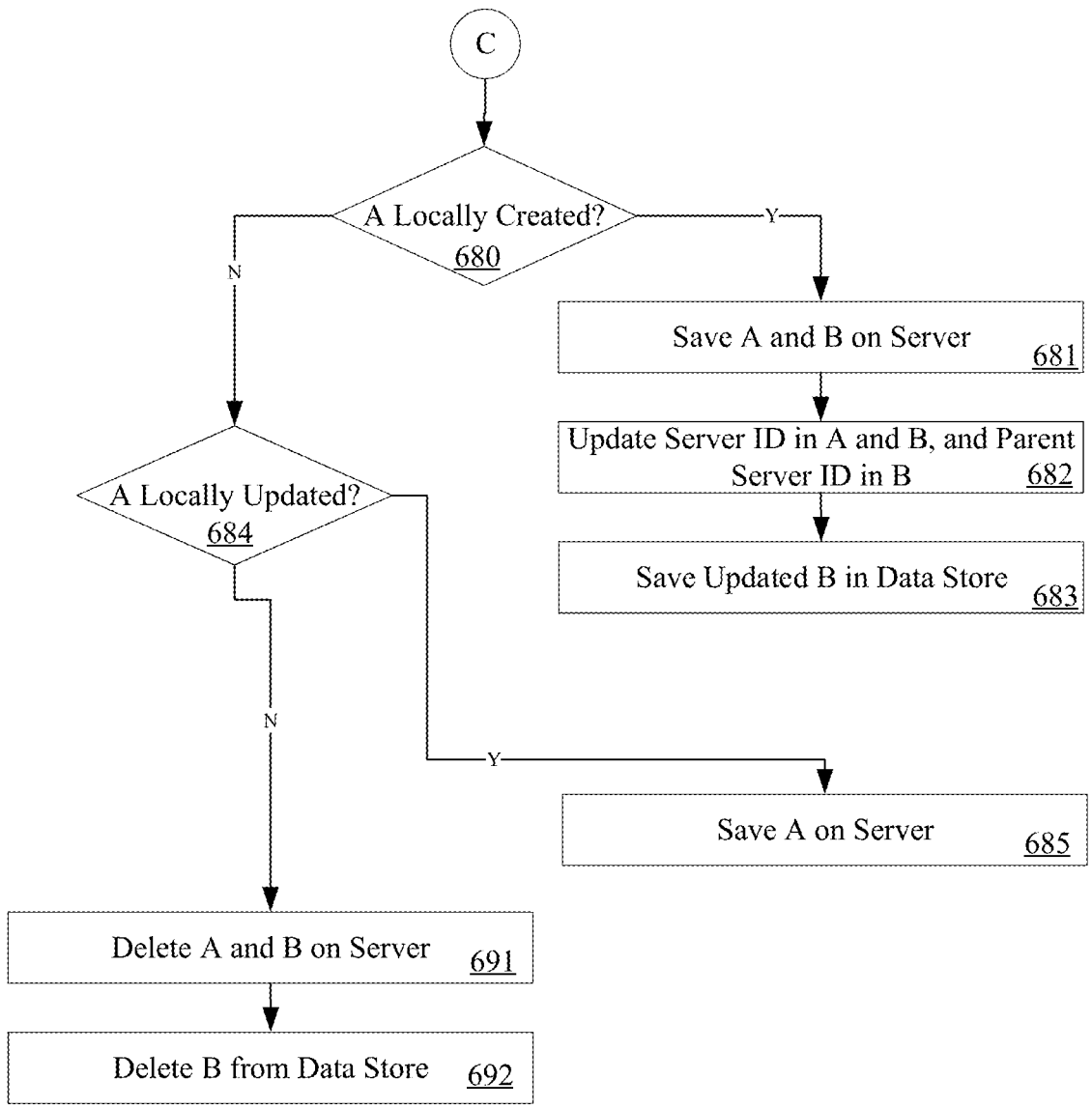

If at decision block 631 a determination is made that object C has not been locally updated, a determination is made as to whether object C has been locally deleted, decision block 661 (FIG. 6C). If C has been locally deleted, a determination is made as to whether object A has been locally created, decision block 662. If A has been locally created, A is new and B does not exist on the server. Accordingly, A is saved on the server, processing block 663. At processing block 664, the server Id is updated in A. At processing block 665, B and C are deleted at data store 230. If at decision block 662 a determination is made that object A has not been locally created, a determination is made as to whether object A has been locally updated, decision block 666. If A has been locally updated, A is saved on the server, processing block 667. At processing block 668, B and C are deleted at data store 230. If at decision block 666 a determination is made that object A has not been locally updated, object A has been locally deleted. Thus at processing block 669, A is deleted on the server. At processing block 670, B and C are deleted from data store 230.

If at decision block 661 a determination is made that object C has not been locally deleted, C has not been changed locally. Accordingly at decision block 680 (FIG. 6D), a determination is made as to whether object A has been locally created. If A has been locally created, A and B are saved on the server, processing block 681. At processing block 682, the server Id is updated in A and B, as well as the parent server Id in B. At processing block 683, the updated B is saved at data store 230.

If at decision block 680 a determination is made that object A has not been locally created, a determination is made as to whether object A has been locally updated, decision block 684. If A has been locally updated, A is saved on the server, processing block 685. If at decision block 684 a determination is made that object A has not been locally updated, object A has been locally deleted. Thus at processing block 691, A and B are deleted on the server. At processing block 692, B is deleted from data store 230. FIG. 7 is a table illustrating one embodiment of a recap of the sync up process.

Sync Down

In one embodiment, the computing device 120 implements relationship queries. In such embodiments, SOQL joins using path expressions and nested selects. For instance, child-to-parent relationship queries may include: SELECT Contact.FirstName, ContactAccount.Name FROM Contact: and SELECT Id, Name, Account.Name. FROM Contact WHERE Account.Industry='media'. Similarly, parent-to-child relationship queries may include: SELECT Name, (SELECT LastName FROM Contacts) FROM Account; and SELECT Account.Name, (SELECT Contact.LastName FROM Account.Contacts) FROM Account.

In a further embodiment, the sync down includes the same data implementations as the for sync up. For example, the application 210 includes soups for each object type, with fields to capture the local and remote server IDs of related records. Additionally, there are sync down targets that are initialized with sufficient information regarding the relations between records (e.g., both on the server and in the local data store), the fields to fetch for each object type and the "root" objects to target. In yet a further embodiment, SOQL is used to obtain related records from the server and save them to the appropriate soups (e.g., after first updating their parent local id pointers).

To illustrate implementation of sync down for single one to many one level deep relationships, the A-B scenario from the above-described sync up section is assumed, in which application 210 is interested in fieldA1, fieldA2 on A and fieldB1, fieldB2 on B and the Id fields on A and B are IdA and IdB, respectively. In such a scenario, records from A are "root" objects. Additionally, the sync down target may be provided with additional criteria for the SOQL query to target specific objects of type A.

To fetch A-B records from the server, the sync down target may use the following SOQL: SELECT IdA, fieldA1, fieldA2, (SELECT IdB, fieldB1, fieldB2 FROM B) FROM A WHERE <criteria passed to sync down query>. Moreover, the sync down target handles the creating/updating records in soupB and only transmits back the fields for A to synchronization engine 240. In various situations record B may need the local Id of record A while synchronization engine 240 is saving record A. Accordingly, synchronization engine 240 implements a refactor management function to delegate the actual saving of the records to the target.

During sync down, locally modified records are left alone, regardless of modified data, if the merge mode is leave-if-changed. Thus when dealing with sets of related records, the record should be left alone if the record or any of the children were locally changed. Therefore in this embodiment, the refactor management function delegates to the target the determination of what records should be left alone.

To illustrate implementation of sync down for single many to many relationships, the A-B-C scenario from the above-described sync up section is assumed, in which application 210 is interested in fieldA1, fieldA2 on A and fieldC1, fieldC2 on C, the Id fields on A, B and C are IdA, IdB and IdC, respectively, and the reference fields to A and C on B are parentAId and parentCId. To fetch A-B-C records from the server, the sync down target uses the following SOQL: SELECT IdC, SELECT IdA, fieldA1, fieldA2 FROM A WHERE <criteria passed to the sync down query>, <SELECT IdB, fieldB1, fieldB2 from B> FROM C. FIG. 8 is a table illustrating one embodiment of a recap of a sync down process.

Figure 9:
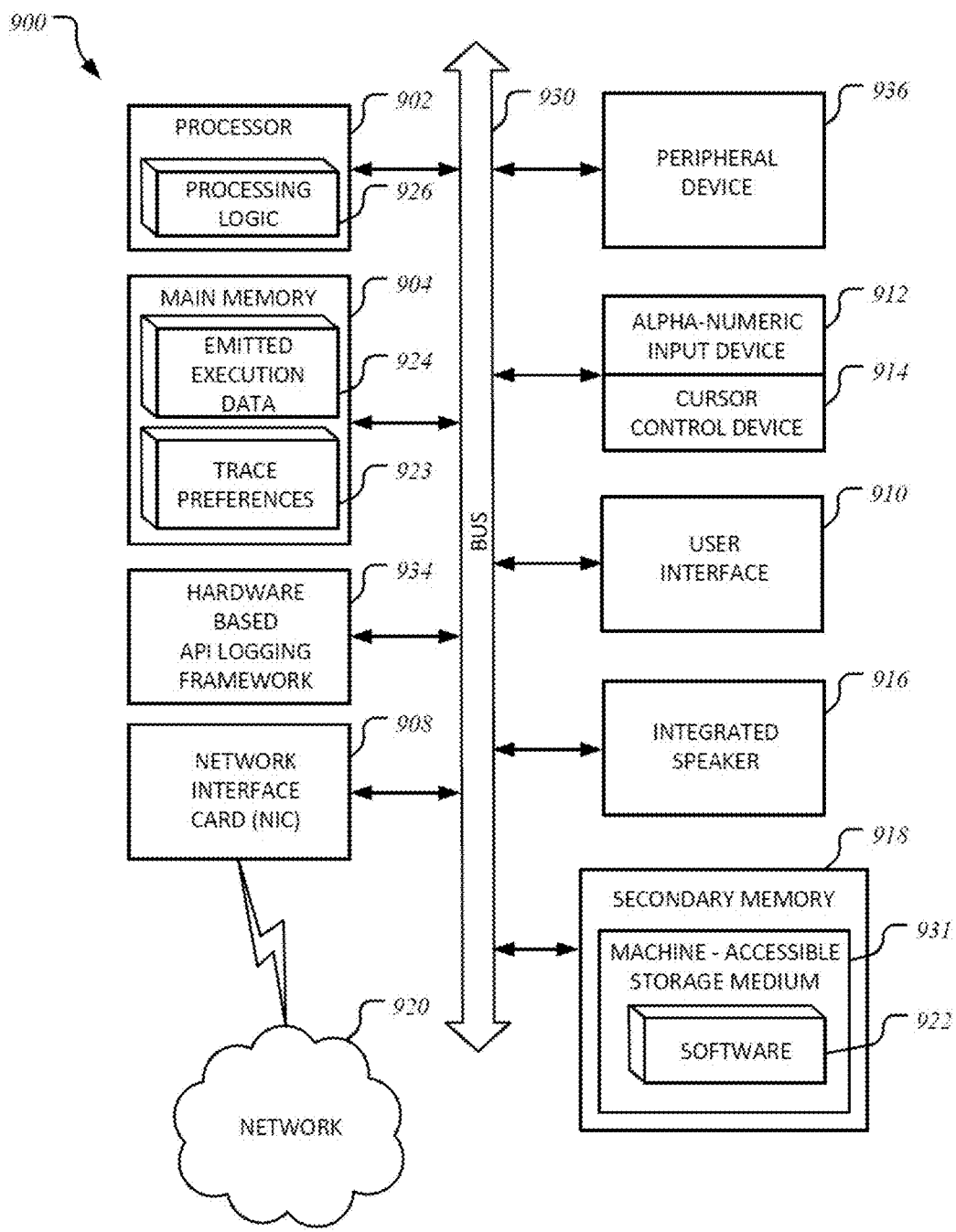
FIG. 9 illustrates a computer system according to one embodiment.

FIG. 9 illustrates a diagrammatic representation of a machine 900 in the exemplary form of a computer system, in accordance with one embodiment, within which a set of instructions, for causing the machine 900 to perform any one or more of the methodologies discussed herein, may be executed. Machine 900 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 918 (e.g., a persistent storage device including hard disk drives and persistent multi-tenant data base implementations), which communicate with each other via a bus 930. Main memory 904 includes emitted execution data 924 (e.g., data emitted by a logging framework) and one or more trace preferences 923 which operate in conjunction with processing logic 926 and processor 902 to perform the methodologies discussed herein.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations as described with reference to FIG. 1 and other Figures discussed herein.

The computer system 900 may further include a network interface card 908. The computer system 900 also may include a user interface 910 (such as a video display unit, a liquid crystal display (LCD), or a cathode ray tube (CRT)), an alphanumeric input device 912 (e.g., a keyboard), a cursor control device 914 (e.g., a mouse), and a signal generation device 916 (e.g., an integrated speaker). The computer system 900 may further include peripheral device 936 (e.g., wireless or wired communication devices, memory devices, storage devices, audio processing devices, video processing devices, etc. The computer system 900 may further include a Hardware based API logging framework 934 capable of executing incoming requests for services and emitting execution data responsive to the fulfillment of such incoming requests.

The secondary memory 918 may include a machine-readable storage medium (or more specifically a machine-accessible storage medium) 931 on which is stored one or more sets of instructions (e.g., software 922) embodying any one or more of the methodologies as described with reference to FIG. 1, respectively, and other figures discussed herein. The software 522 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface card 908. The machine-readable storage medium 931 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 10:
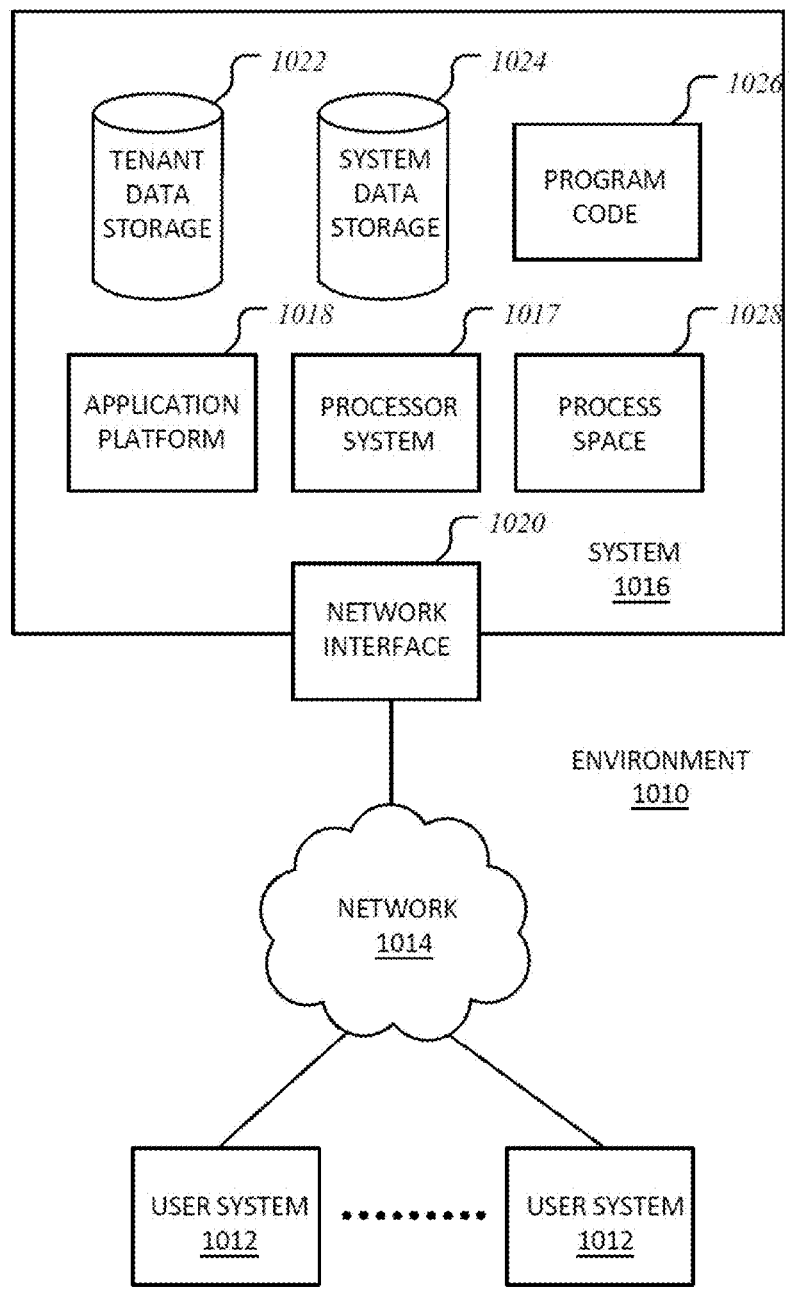
FIG. 10 illustrates an environment wherein an on-demand database service might be used according to one embodiment.

FIG. 10 illustrates a block diagram of an environment 1010 wherein an on-demand database service might be used. Environment 1010 may include user systems 1012, network 1014, system 1016, processor system 1017, application platform 618, network interface 1020, tenant data storage 1022, system data storage 1024, program code 1026, and process space 1028. In other embodiments, environment 1010 may not have all of the components listed and/or may have other elements instead of, or in addition to, those listed above.

Environment 1010 is an environment in which an on-demand database service exists. User system 1012 may be any machine or system that is used by a user to access a database user system. For example, any of user systems 1012 can be a handheld computing device, a mobile phone, a laptop computer, a workstation, and/or a network of computing devices. As illustrated in herein FIG. 10 (and in more detail in FIG. 11) user systems 1012 might interact via a network 1014 with an on-demand database service, which is system 1016.

An on-demand database service, such as system 1016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1016" and "system 1016" will be used interchangeably herein. A database image may include one or more database objects. A relational database management system (RDMS) or the equivalent may execute storage and retrieval of information against the database object(s). Application platform 1018 may be a framework that allows the applications of system 1016 to run, such as the hardware and/or software, e.g., the operating system. In an embodiment, on-demand database service 1016 may include an application platform 1018 that enables creation, managing and executing one or more applications developed by the provider of the on-demand database service, users accessing the on-demand database service via user systems 1012, or third party application developers accessing the on-demand database service via user systems 1012.

The users of user systems 1012 may differ in their respective capacities, and the capacity of a particular user system 1012 might be entirely determined by permissions (permission levels) for the current user. For example, where a salesperson is using a particular user system 1012 to interact with system 1016, that user system has the capacities allotted to that salesperson. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1014 is any network or combination of networks of devices that communicate with one another. For example, network 1014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 10, implements a web-based customer relationship management (CRM) system. For example, in one embodiment, system 616 includes application servers configured to implement and execute CRM software applications as well as provide related data, code, forms, webpages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 1016.

One arrangement for elements of system 1016 is shown in FIG. 10, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database-indexing processes.

Several elements in the system shown in FIG. 10 include conventional, well-known elements that are explained only briefly here. For example, each user system 1012 could include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1012 to access, process and view information, pages and applications available to it from system 1016 over network 1014. User system 1012 further includes Mobile OS (e.g., iOS® by Apple®, Android®, WebOS® by Palm®, etc.). Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device can be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Core® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1016 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1016 is configured to provide webpages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 11:
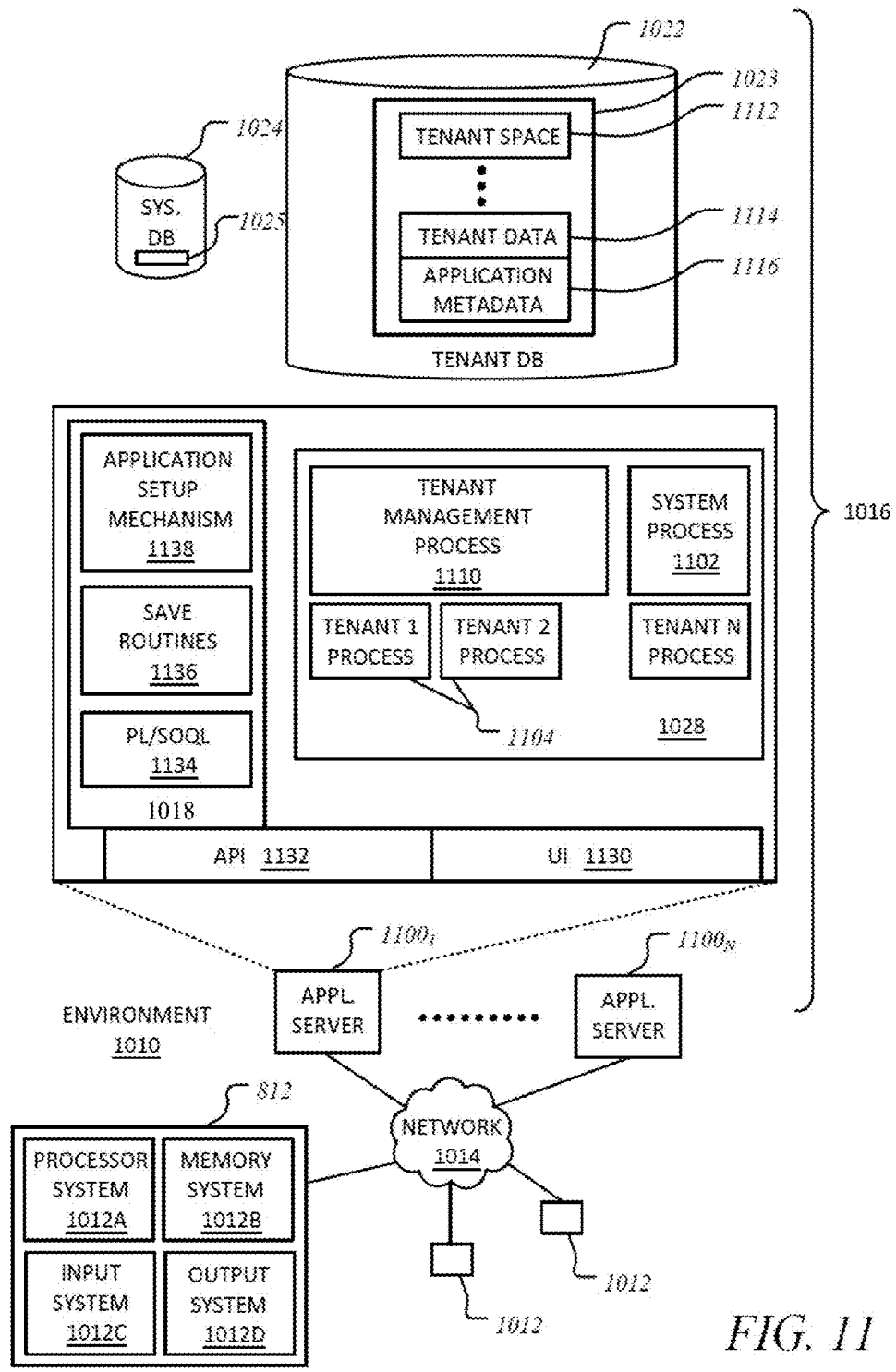
FIG. 11 illustrates elements of environment of FIG. 10 and various possible interconnections between these elements according to one embodiment.

FIG. 11 also illustrates environment 1010. However, in FIG. 11 elements of system 1016 and various interconnections in an embodiment are further illustrated. FIG. 11 shows that user system 1012 may include processor system 1012A, memory system 1012B, input system 1012C, and output system 1012D. FIG. 11 shows network 1014 and system 1016. FIG. 11 also shows that system 1016 may include tenant data storage 1022, tenant data 1023, system data storage 1024, system data 1025, User Interface (UI) 1130, Application Program Interface (API) 1132, PL/SOQL 1134, save routines 1136, application setup mechanism 1138, applications servers 1100₁-1100ₙ, system process space 1102, tenant process spaces 1104, tenant management process space 1110, tenant storage area 1112, user storage 1114, and application metadata 1116. In other embodiments, environment 1010 may not have the same elements as those listed above and/or may have other elements instead of, or in addition to, those listed above.

User system 1012, network 1014, system 1016, tenant data storage 1022, and system data storage 1024 were discussed above in FIG. 10. Regarding user system 1012, processor system 1012A may be any combination of one or more processors. Memory system 1012B may be any combination of one or more memory devices, short term, and/or long term memory. Input system 1012C may be any combination of input devices, such as one or more keyboards, mice, trackballs, scanners, cameras, and/or interfaces to networks. Output system 1012D may be any combination of output devices, such as one or more monitors, printers, and/or interfaces to networks. As shown by FIG. 11, system 1016 may include a network interface 1020 (of FIG. 10) implemented as a set of HTTP application servers 1100, an application platform 1018, tenant data storage 1022, and system data storage 1024. Also shown is system process space 1102, including individual tenant process spaces 1104 and a tenant management process space 1110. Each application server 1100 may be configured to tenant data storage 1022 and the tenant data 1023 therein, and system data storage 1024 and the system data 1025 therein to serve requests of user systems 1012. The tenant data 1023 might be divided into individual tenant storage areas 1112, which can be either a physical arrangement and/or a logical arrangement of data. Within each tenant storage area 1112, user storage 1114 and application metadata 1116 might be similarly allocated for each user. For example, a copy of a user's most recently used (MRU) items might be stored to user storage 1114. Similarly, a copy of MRU items for an entire organization that is a tenant might be stored to tenant storage area 1112. A UI 1130 provides a user interface and an API 71132 provides an application programmer interface to system 1016 resident processes to users and/or developers at user systems 1012. The tenant data and the system data may be stored in various databases, such as one or more Oracle™ databases.

Application platform 1018 includes an application setup mechanism 1138 that supports application developers' creation and management of applications, which may be saved as metadata into tenant data storage 1022 by save routines 1136 for execution by subscribers as one or more tenant process spaces 1104 managed by tenant management process 1110 for example. Invocations to such applications may be coded using PL/SOQL 1134 that provides a programming language style interface extension to API 1132. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1116 for the subscriber making the invocation and executing the metadata as an application in a virtual machine.

Each application server 1100 may be communicably coupled to database systems, e.g., having access to system data 1025 and tenant data 1023, via a different network connection. For example, one application server 1100₁ might be coupled via the network 1014 (e.g., the Internet), another application server 1100ₙ₋₁ might be coupled via a direct network link, and another application server 1100ₙ might be coupled by yet a different network connection. Transfer Control Protocol and Internet Protocol (TCP/IP) are typical protocols for communicating between application servers 1100 and the database system. However, it will be apparent to one skilled in the art that other transport protocols may be used to optimize the system depending on the network interconnect used.

In certain embodiments, each application server 1100 is configured to handle requests for any user associated with any organization that is a tenant. Because it is desirable to be able to add and remove application servers from the server pool at any time for any reason, there is preferably no server affinity for a user and/or organization to a specific application server 1100. In one embodiment, therefore, an interface system implementing a load balancing function (e.g., an F5 Big-IP load balancer) is communicably coupled between the application servers 1100 and the user systems 1012 to distribute requests to the application servers 1100. In one embodiment, the load balancer uses a least connections algorithm to route user requests to the application servers 1100. Other examples of load balancing algorithms, such as round robin and observed response time, also can be used. For example, in certain embodiments, three consecutive requests from the same user could hit three different application servers 1100, and three requests from different users could hit the same application server 1100. In this manner, system 1016 is multi-tenant, wherein system 1016 handles storage of, and access to, different objects, data and applications across disparate users and organizations.

As an example of storage, one tenant might be a company that employs a sales force where each salesperson uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client systems) communicate with application servers 1100 to request and update system-level and tenant-level data from system 1016 that may require sending one or more queries to tenant data storage 1022 and/or system data storage 1024. System 1016 (e.g., an application server 1100 in system 1016) automatically generates one or more SQL statements (e.g., one or more SQL queries) that are designed to access the desired information. System data storage 1024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method, comprising:
    detecting, by a computing device, a conflict between data stored at the computing device and data stored at a service provider database system; and
    performing, by the computing device, a synchronization operation to synchronize one or more objects within hierarchical object data stored at the computing device with hierarchical object data stored at the service provider database system, including:
        determining relationship information between database records within one or more tables stored at the computing device;
        determining a first database record in a first table that has been changed;

retrieving the first database record to be synchronized in response to determining that the first database record has been changed;

using the relationship information to retrieve a set of database records related to the first database record in response to determining that the first database record has been changed, the set of database records including at least a second database record of a second table, the first database record having a field referencing the second database record; and transmitting, by the computing device to the service provider database system, a single message indicating one or more updates to the service provider database system, the message including an identifier of the first table, an identifier of the second table, one or more fields of the first database record, and one or more fields of the second database record.

2. The method of claim 1, wherein the synchronization operation comprises a sync up operation to upload a hierarchy of objects from the computing device to the service provider database system in response to changes to the hierarchical object data stored at the computing device.

3. The method of claim 2, wherein the sync up operation comprises determining changes made to the hierarchical object data stored at one or more tables within the computing device.

4. The method of claim 3, wherein the synchronization operation comprises the computing device transmitting the hierarchical object data to the service provider database system.

5. The method of claim 4 wherein the transmitted hierarchical object data represent changes to one or more objects in the hierarchical object data at the service provider database.

6. The method of claim 4, wherein the transmitted hierarchical object data is to leave intact changes to one or more objects in the hierarchical object data at the service provider database system.

7. The method of claim 2, wherein the synchronization operation further comprises a sync down operation to download a hierarchy of objects from the service provider database system to the computing device in response to changes to the hierarchical object data stored at the service provider database system.

8. The method of claim 7, wherein the sync down operation comprises determining changes made to the hierarchical object data stored at one or more tables within the service provider database system.

9. The method of claim 8, wherein the synchronization operation comprises the computing device receiving one or more objects in the hierarchical object data that have been changed at the service provider database system.

10. The method of claim 8, wherein the synchronization operation comprises the computing device receiving all hierarchical object data from the service provider database system.

11. A non-transitory computer-readable medium having stored there on instructions that, when executed by one or more processors, are configurable to cause the one or more processors to:

detect a conflict between data stored at a computing device and data stored at a service provider database system; and perform a synchronization operation to synchronize one or more objects within hierarchical object data stored at the computing device with hierarchical object data stored at the service provider database system, including:

determining relationship information between database records within one or more tables stored at the computing device;

determining a first database record in a first table that has been changed;

retrieving the first database record to be synchronized in response to determining that the first database record has been changed;

using the relationship information to retrieve a set of database records related to the first database record in response to determining that the first database record has been changed, the set of database records including at least a second database record of a second table, the first database record having a field referencing the second database record; and transmitting by the computing device to the service provider database system, a single message indicating one or more updates to the service provider database system, the message including an identifier of the first table, an identifier of the second table, one or more fields of the first database record, and one or more fields of the second database record.

12. The computer-readable medium of claim 11, wherein the synchronization operation comprises a sync up operation to upload a hierarchy of objects from the computing device to the service provider database system in response to changes to the hierarchical object data stored at the computing device.

13. The computer-readable medium of claim 12, wherein the sync up operation comprises determining changes made to the hierarchical object data stored at one or more tables within the computing device.

14. The computer-readable medium of claim 13, wherein the synchronization operation comprises the computing device transmitting the hierarchical object data to the service provider database system.

15. The computer-readable medium of claim 14, wherein the transmitted hierarchical object data represent changes to one or more objects in the hierarchical object data at the service provider database system.

16. The computer-readable medium of claim 15, wherein the transmitted hierarchical object data is to leave intact changes to one or more objects in the hierarchical object data at the service provider database system.

17. The computer-readable medium of claim 12, wherein the synchronization operation further comprises a sync down operation to download a hierarchy, of objects from the service provider database system to the computing device in response to changes to the hierarchical object data stored at the service provider database system.

18. The computer-readable medium of claim 17, wherein the synchronization operation comprises the computing device receiving hierarchical object data from the service provider database system.

19. The computer-readable medium of claim 18, wherein the synchronization operation comprises the computing device receiving one or more objects in the hierarchical object data that have been changed at the service provider database system.

20. The computer-readable medium of claim 18, wherein the synchronization operation comprises the computing device receiving all hierarchical object data from the service provider database system.

21. A mobile device comprising:

one or more processors coupled with at least one memory device, the one ormore processors configurable to cause:

detecting a conflict between data stored at the mobile device and data stored at a service provider database system; and performing a synchronization operation to synchronize one or more objects within hierarchical object data stored at the computing device with hierarchical object data stored at the service provider database system, including:

determining relationship information between database records within one or more tables stored at the computing device;

determining a first database record in a first table that has been changed;

retrieving the first database record to be synchronized in response to determining that the first database record has been changed;

using the relationship information to retrieve a set of database records related to the first database record in response to determining that the first database record has been changed, the set of database records including at least a second database record of a second table, the first database record having a field referencing the second database record; and transmitting, by the computing device to the service provider database system, a single message indicating one or more updates to the service provider database system, the message including an identifier of the first table, an identifier of the second table, one or more fields of the first database record, and one or more fields of the second database record.

22. The mobile device of claim 21, wherein the synchronization operation comprises a sync up operation to upload a hierarchy of objects from the mobile device to the service provider database system in response to changes to the hierarchical object data stored at the mobile device.

23. The mobile device of claim 22, wherein the hierarchical object data comprises a plurality of objects, each object having a corresponding one of a plurality of object types.

24. The mobile device of claim 23, wherein the hierarchical object data further comprises a table corresponding to each of a plurality of object types.

25. The mobile device of claim 24, wherein each object comprises a first field to store a local identifier and a second field to store a remote identifier.

26. The mobile device of claim 22, wherein the sync up operation comprises determining changes made to the hierarchical object data stored at one or more tables within the mobile device.

27. The mobile device of claim 26, wherein the synchronization operation further comprises a sync down operation to download a hierarchy of objects from the service provider database system to the mobile device in response to changes to the hierarchical object data stored at the service provider database system.

* * * * *